(12) United States Patent
Chang et al.

(10) Patent No.: US 11,816,145 B2
(45) Date of Patent: Nov. 14, 2023

(54) METHOD, SYSTEM AND COMPUTER PROGRAM FOR COLORING BASED ON DEEP LEARNING

(71) Applicants: NAVER WEBTOON LTD., Seongnam-si (KR); KOREA UNIVERSITY RESEARCH AND BUSINESS FOUNDATION, Seoul (KR)

(72) Inventors: Jae Hyuk Chang, Seongnam-si (KR); Jae Gul Choo, Seoul (KR); Seung Joo Yoo, Seoul (KR); Sung Hyo Chung, Seoul (KR); Ga Young Lee, Seongnam-si (KR); Hyo Jin Bahng, Seoul (KR)

(73) Assignees: NAVER WEBTOON LTD., Seongnam-si (KR); KOREA UNIVERSITY RESEARCH AND BUSINESS FOUNDATION, Seoul (KR)

(*) Notice: Subject to any disclaimer, the term of this patent is extended or adjusted under 35 U.S.C. 154(b) by 237 days.

(21) Appl. No.: 17/449,710

(22) Filed: Oct. 1, 2021

(65) Prior Publication Data
US 2022/0092106 A1    Mar. 24, 2022

Related U.S. Application Data

(63) Continuation of application No. PCT/KR2020/004476, filed on Apr. 1, 2020.

(30) Foreign Application Priority Data

Apr. 2, 2019    (KR) .................. 10-2019-0038612

(51) Int. Cl.
*G06F 16/535*    (2019.01)
*G06N 3/045*    (2023.01)

(52) U.S. Cl.
CPC .......... *G06F 16/535* (2019.01); *G06N 3/045* (2023.01)

(58) Field of Classification Search
CPC ............................ G06F 16/535; G06N 3/045
(Continued)

(56) References Cited

U.S. PATENT DOCUMENTS 10,460,231 B2    10/2019    Zhang et al.
10,496,924 B1    12/2019    Highnam et al.
(Continued)

FOREIGN PATENT DOCUMENTS

KR    101191172 B1    10/2012
KR    1020170078516 A    7/2017
(Continued)

OTHER PUBLICATIONS

Notice of allowance issued in Korean patent application No. 19-38612, dated Oct. 29, 2020.
(Continued)

*Primary Examiner* — Joshua Bullock
(74) *Attorney, Agent, or Firm* — Greer Burns & Crain Ltd.

(57) ABSTRACT

A deep learning-based coloring system includes a memory network configured to provide a color feature in response to a specific query and a coloring network configured to perform coloring, based on the color feature generated by the memory network. The memory network includes: a query generation unit configured to generate a query; a neighbor calculation unit configured to calculate k-nearest neighbors, based on similarities between the query and key memory values; a color feature determination unit configured to generate color features for indicating color information stored in the key memory; a threshold triplet loss calculation unit configured to calculate a threshold triplet
(Continued)

loss, based on a comparison between a threshold and a distance between the color features; and a memory update unit configured to update a memory, based on whether a distance between a top value and a value of a newly input query is within the threshold.

14 Claims, 7 Drawing Sheets

(58) Field of Classification Search
USPC .......................................................... 707/736
See application file for complete search history.

(56) References Cited

U.S. PATENT DOCUMENTS

| | | | |
|---|---|---|---|
| 11,663,642 B2* | 5/2023 | Sollami | G06T 7/90 |
| | | | 705/26.62 |
| 11,684,843 B2* | 6/2023 | Choi | B62K 11/00 |
| | | | 180/181 |
| 2014/0136566 A1 | 5/2014 | Kim et al. | |
| 2017/0185871 A1* | 6/2017 | Zhang | G06V 30/19173 |
| 2018/0204120 A1 | 7/2018 | Rei et al. | |
| 2019/0318228 A1 | 10/2019 | Kim et al. | |
| 2020/0193207 A1* | 6/2020 | Kim | G06V 10/454 |
| 2020/0285938 A1 | 9/2020 | Kim et al. | |
| 2021/0103969 A1* | 4/2021 | Sollami | G06T 7/90 |
| 2021/0133506 A1 | 5/2021 | Kaehler et al. | |
| 2022/0092108 A1* | 3/2022 | Collomosse | G06F 16/535 |
| 2023/0222154 A1* | 7/2023 | Chow | G06F 16/535 |
| | | | 382/305 |

FOREIGN PATENT DOCUMENTS

| | | |
|---|---|---|
| KR | 1020190028235 A | 3/2019 |
| KR | 1020190118816 A | 10/2019 |
| WO | 2017006104 A1 | 1/2017 |
| WO | 2019022849 A1 | 1/2019 |

OTHER PUBLICATIONS

Mingming He et al.; Deep Exemplar-Based Colorization; Computer Vision and Pattern Recognition; Cornell University; arXiv:1807.06587v2 [cs.CV] Jul. 21, 2018; pp. 1-16.
Weihua Chen et al.; Beyond triplet loss: a deep quadruplet network for person re-identification; Computer Vision and Pattern Recognition; Cornell University; arXiv:1704.01719v1 [cs.CV] Apr. 6, 2017; pp. 1-11.
Yi Xiao et al.; Interactive Deep Colorization with Simultaneous Global and Local Inputs; Computer Vision and Pattern Recognition; Cornell University; arXiv:1801.09083v1 [cs.CV] Jan. 27, 2018; pp. 1-14.
Longlong Jing et al.; Self-supervised Visual Feature Learning with deep Neural Networks: A Survey; Computer Vision and Pattern Recognition; Cornell University; arXiv:1902.06162v1 [cs.CV] Feb. 16, 2019; pp. 1-25.
Seungjoo Yoo et al.; Coloring With Limited Data: Few-Shot Colorization via Memory-Augmented Networks; Computer Vision and Pattern Recognition; Cornell University; arXiv:1906.11888v1 [cs.CV]; Jun. 9, 2019; pp. 1-11.
ISR issued in PCT/KR2020/004476, dated Jul. 2, 2020.

* cited by examiner

$KL(V[n_i] \parallel v) < \delta$

METHOD, SYSTEM AND COMPUTER PROGRAM FOR COLORING BASED ON DEEP LEARNING

TECHNICAL FIELD

The present disclosure relates to a deep learning-based coloring method, system, and program, and more particularly, to a coloring method, system, and program reinforced by an external neural memory.

BACKGROUND ART

In animation or cartoon content production, a coloring or colorization work is a most time-consuming and costly stage. In this regard, there have been many attempts to automate the coloring work, and despite the development of a deep learning-based coloring model, the use thereof in an actual field is extremely limited. There are many limits on using the deep learning-based coloring model in an actual environment.

In detail, a large amount of data is required to train an existing deep learning-based coloring model, but due to issues, such as copyright and the like, there is a limit on obtaining training data of animation or cartoon content. In addition, the existing deep learning-based coloring model is often trained to ignore a rare color and select a most frequently appearing color, and in this case, coloring of a supporting character of animation or a cartoon may become inappropriate. Accordingly, it is difficult to use the deep learning-based coloring model in an actual field.

DESCRIPTION OF EMBODIMENTS

Technical Problem

The present disclosure is directed to providing a deep learning-based coloring method capable of training a coloring model by using only a limited number of pieces of cartoon or animation data.

Also, the present disclosure is directed to enabling coloring of a color that does not frequently appear.

Also, the present disclosure is directed to providing a threshold triplet loss enabling training of a memory network in an unsupervised environment.

Solution to Problem

According to an embodiment of the present disclosure, there is provided a deep learning-based coloring system including: a memory network configured to provide a color feature in response to a specific query and including a key memory related to a spatial feature and a value memory related to a color feature; and a coloring network configured to perform coloring, based on the color feature generated by the memory network, wherein the memory network includes: a query generation unit configured to generate a query; a neighbor calculation unit configured to calculate k-nearest neighbors, based on similarities between the query and key memory values; a color feature determination unit configured to generate a plurality of color features for indicating color information stored in the key memory; a threshold triplet loss calculation unit configured to calculate a threshold triplet loss, based on a comparison between a threshold and a distance between the plurality of color features generated by the color feature determination unit; and a memory update unit configured to update a memory, based on whether a distance between a top value and a value of a newly input query is within the threshold.

The k-nearest neighbors may be determined to be memory slots having similarities between the query and the spatial feature from 1 to k, based on cosine similarities between the query and the key memory values.

The top value may be a value memory value having a same index as a key memory value having a highest cosine similarity with the query, when a 1-nearest neighbor is calculated from among the k-nearest neighbors.

The threshold triplet loss may be a value that maximizes a similarity between the query and a positive key and minimizes a similarity between the query and a negative key.

The positive key may be a key memory value having a same index as a nearest value memory value from among value memory values of which distances to a color feature value of the query are less than the threshold, and the negative key may be a key memory value having a same index as a value memory value having a smallest distance from among value memory values of which distances to the color feature value of the query exceed the threshold.

The color feature may include two types of variants, wherein the two types of variants include Cdist obtained by calculating a probability value regarding how many of 313 colors pre-set for each image there are, and CRGB obtained by extracting 10 pixel values most dominant for each image by using a pre-set library.

The memory network may determine that images having spatial features corresponding to the k-nearest neighbors and color features corresponding to color distances to the query, which are less than the threshold, belong to a same class.

The coloring network may include a generator and a determiner, wherein the determiner may receive a gray scale input image and the color feature.

The memory network may be configured to additionally store an age, wherein the age may indicate a life of an item stored in the memory.

According to another embodiment of the present disclosure, there is provided a deep learning-based coloring method including: generating a query; calculating k-nearest neighbors, based on similarities between the query and key memory values; generating a plurality of color features for indicating color information stored in a key memory; calculating a threshold triplet loss, based on a comparison between a threshold and a distance between the plurality of color features; and updating a memory, based on whether a distance between a top value and a value of a newly input query is within the threshold.

The k-nearest neighbors may be determined to be memory slots having similarities between the query and spatial feature from 1 to k, based on cosine similarities between the query and the key memory values.

The top value may be a value memory value having a same index as a key memory value having a highest cosine similarity with the query, when a 1-nearest neighbor is calculated from among the k-nearest neighbors.

The threshold triplet loss may be a value that maximizes a similarity between the query and a positive key and minimizes a similarity between the query and a negative key, wherein the positive key may be a key memory value having a same index as a nearest value memory value from among value memory values of which distances to a color feature value of the query are less than the threshold, and the negative key may be a key memory value having a same index as a value memory value having a smallest distance from among value memory values of which distances to the color feature value of the query exceed the threshold.

The color feature may include two types of variants, wherein the two types of variants include Cdist obtained by calculating a probability value regarding how many of 313 colors pre-set for each image there are, and CRGB obtained by extracting 10 pixel values most dominant for each image by using a pre-set library.

Also, a computer program stored in a computer-readable recording medium to execute the method according to the present disclosure is further provided.

Advantageous Effects of Disclosure

According to the present disclosure, one shot or few shot coloring is possible because coloring may be learned by using minimum pieces of data.

Also, according to the present disclosure, a dominant color effect may be resolved because a memory network is trained to fetch a value memory corresponding to a key memory value most similar to a spatial feature.

MODE OF DISCLOSURE

The detailed description of the present disclosure to be described below refers to the accompanying drawings, which illustrate specific embodiments in which the present disclosure may be practiced. These embodiments are described in sufficient detail to enable one of ordinary skill in the art to practice the present disclosure. It is to be understood that various embodiments of the present disclosure are different from each other, but need not be mutually exclusive. For example, specific shapes, structures, and characteristics described herein may be changed from one embodiment to another embodiment and implemented without departing from the spirit and scope of the present disclosure. In addition, it should be understood that positions or arrangements of individual elements in each embodiment may be changed without departing from the spirit and scope of the present disclosure. Accordingly, the detailed description described below is not implemented in a limiting sense, and the scope of the present disclosure may encompass the scope claimed by claims and all scopes equivalent thereto. In drawings, the like reference numerals denote the same or similar elements over various aspects.

Hereinafter, various embodiments of the present disclosure will be described in detail with reference to accompanying drawings to enable one of ordinary skill in the art to easily execute the present disclosure.

Figure 1:
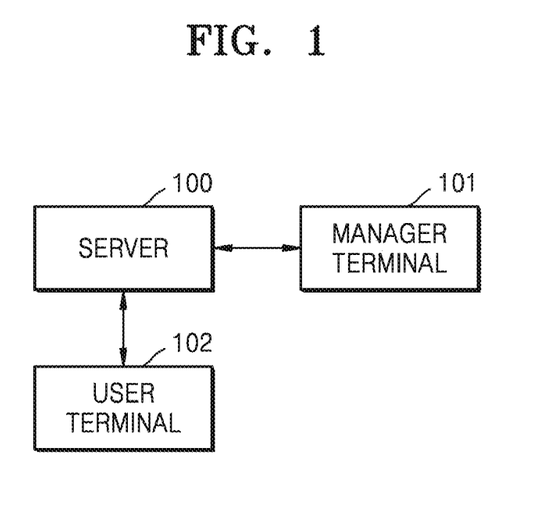
FIG. 1 is a diagram showing a configuration of a deep learning-based coloring system, according to an embodiment of the present disclosure.

FIG. 1 is a diagram showing a configuration of a deep learning-based coloring system, according to an embodiment of the present disclosure.

Referring to FIG. 1, the deep learning-based coloring system according to an embodiment of the present disclosure may include a server 100, a manager terminal 101, and a user terminal 102. The server 100 of the present disclosure may configure a memory network and perform a coloring work of coloring a gray scale image. In the specification below, coloring may denote all operations of coloring a portion or all of an image. Also, although not illustrated in FIG. 1, operations of the server 100 described in the present specification may be performed by a processor included in the server 100.

Also, the manager terminal 101 may be a terminal of a manager, which determines an operation of the deep learning-based coloring system provided by the server 100, provides initial training data, and manages a configuration of all processes performed by the server 100. In addition, the user terminal 102 may be a terminal of a user, which requests the server 100 for an image to be colored and obtains the colored image.

A deep learning-based coloring system and method of the present disclosure provide a system and method for coloring an image, based on a deep learning algorithm. There are existing deep learning-based coloring methods, but two limits below are present in applying the same to an actual field.

First, a large amount of data is required to train a deep learning-based coloring model, but an available number of pieces of animation and cartoon data is limited. A photograph can be taken with a camera and simply converted into a gray scale, and thus, abundant pieces of training data may be easily obtained, but animation and cartoon data is obtained after animation and a cartoon are drawn by hand and complexly colored, and thus is difficult to be obtained. In this regard, existing coloring models are mostly applied to former black and white photographs by learning actual photograph images, but because current photographs are mostly produced in colors, such a work is no longer necessary. Accordingly, there is a need to learn a method of coloring animation and a cartoon by using a small amount of data, separately from a method of learning a photograph.

Second, the existing coloring model selects to ignore a rare case and learn a most frequently appearing color so as to generalize data. However, remembering a rare case is important when various characters appear in content. There is an issue of a dominant effect, in which supporting characters are colored like leading characters, because the supporting characters who rarely appear are ignored from a coloring network. The dominant effect occurs when a coloring model learns coloring only using some dominant colors in a training set. Accordingly, the existing model is no longer able to maintain color identification of defining a specific object class in a unique color distinguished from another object class.

The present disclosure is for compensating for such limits of the existing coloring model, and according to the present disclosure, a coloring network reinforced by external neural memory networks is provided.

Figure 2:
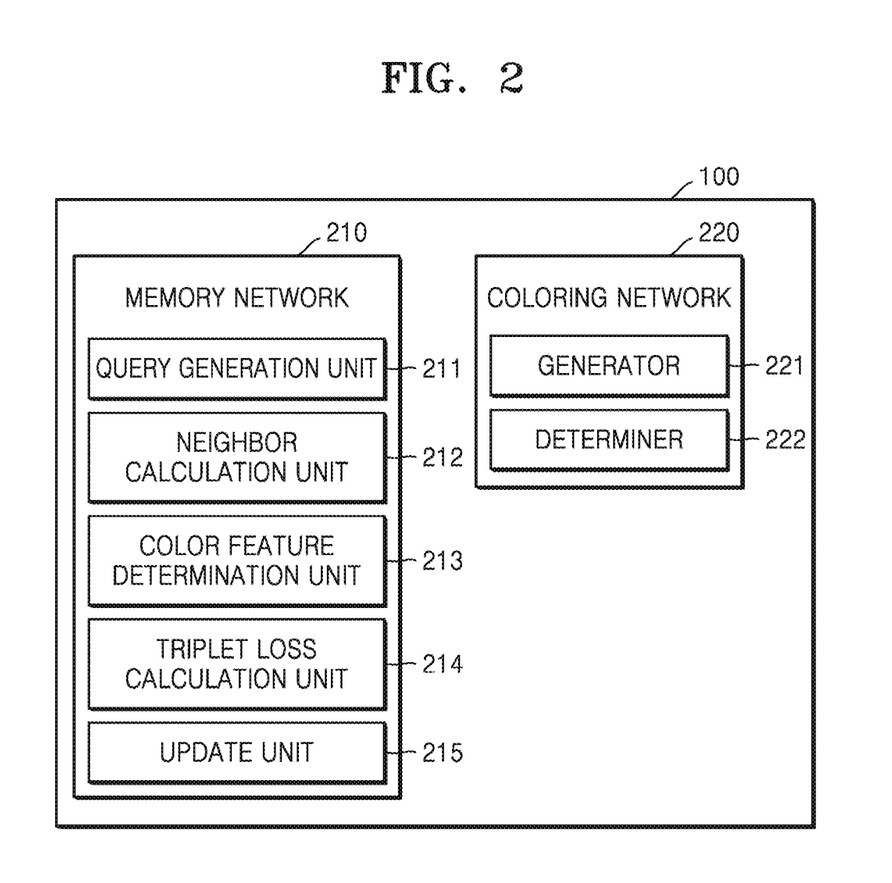
FIG. 2 is a diagram showing an internal configuration of a server of the present disclosure.

FIG. 2 is a diagram showing an internal configuration of a server of the present disclosure.

Referring to FIG. 2, the server 100 of the present disclosure includes a memory network 210 and a coloring network 220, the memory network 210 includes a query generation unit 211, a neighbor calculation unit 212, a color feature determination unit 213, a triplet loss calculation unit 214, and an update unit 215, and the coloring network 220 includes a generator 221 and a determiner 222.

Although the memory network 210 is included in the server 100 in FIG. 2, the memory network 210 is not necessarily present in the server 100 physically. The memory network 210 may be a neural network inside or outside the server 100, and according to an embodiment of the present disclosure, the neural network may be externally separately configured without depending on a memory inside the coloring network 220, so as to efficiently supply limited data to the coloring network 220.

First, the memory network 210 is configured to include a key memory related to a space, a value memory related to a color, and an age. Also, the coloring network 220 may perform coloring on an image, based on a color feature generated by a memory network configuration unit.

Figure 3:
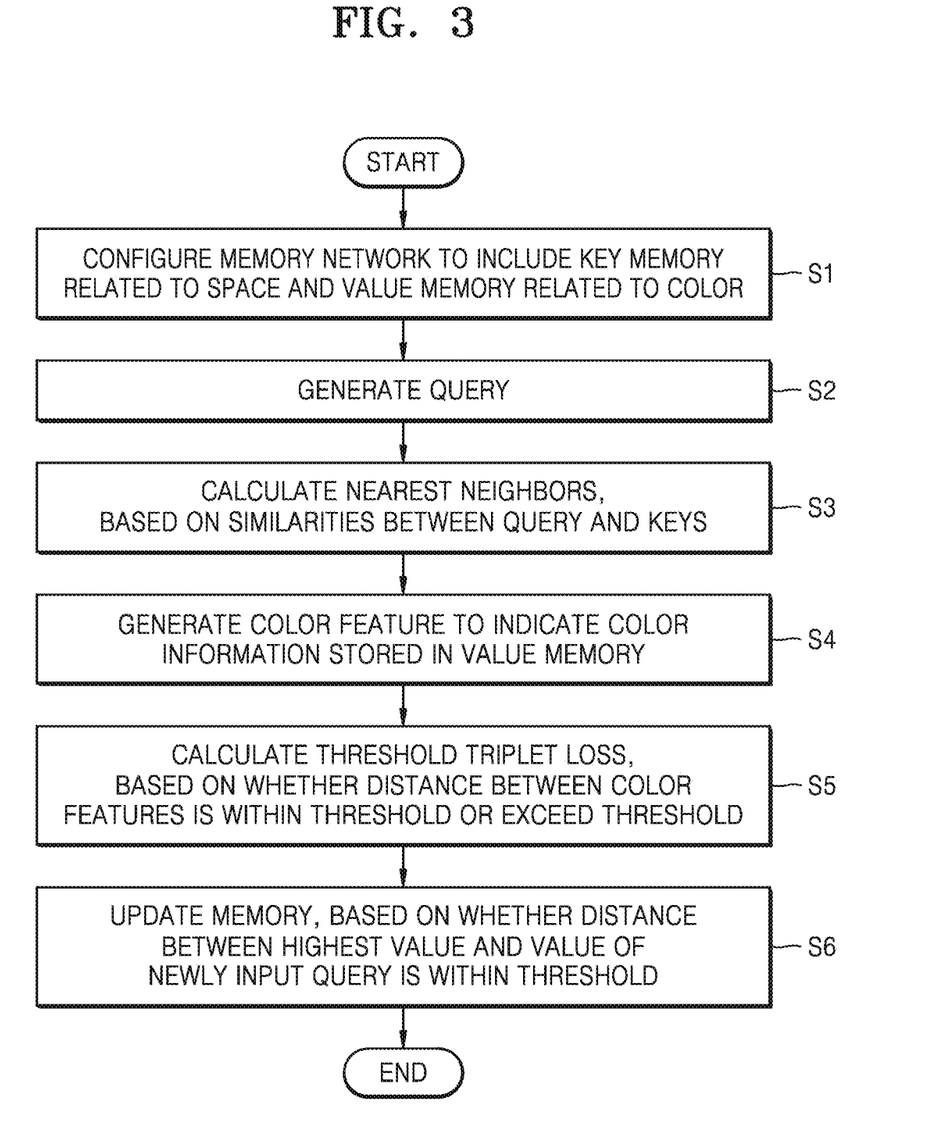
FIG. 3 illustrates, in time-series, operations of a memory network, according to an embodiment of the present disclosure.

FIG. 3 illustrates, in time-series, operations of a memory network, according to an embodiment of the present disclosure.

Figure 4:
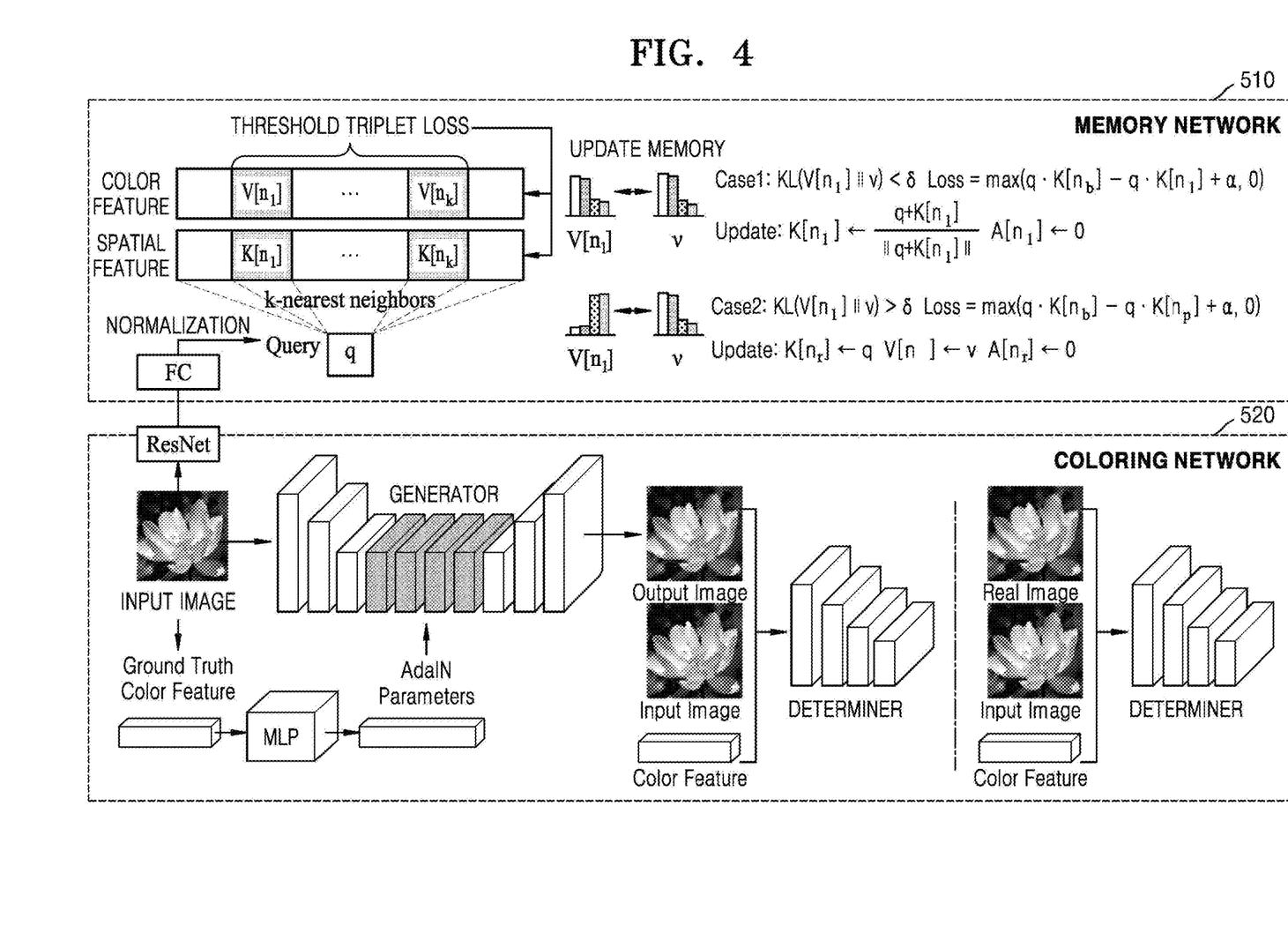
FIG. 4 is a diagram for describing operations of a memory network and coloring network, according to an embodiment of the present disclosure.

Also, FIG. 4 is a diagram for describing operations of a memory network and coloring network, according to an embodiment of the present disclosure.

Hereinafter, a deep learning-based coloring method of the present disclosure will be described with reference to FIGS. 2 through 4 together. As shown in FIGS. 2 through 4, a coloring system or coloring model of the present disclosure includes a memory network 510 and a coloring network 520. The coloring system may reinforce the coloring network 520 by using the memory network 510, so as to remember a rare case and generate a high-quality color by using limited data. The memory network 510 of the present disclosure is characterized in how key and value memories are configured. According to the present disclosure, a threshold triplet loss enabling unsupervised learning of the memory network 510 is provided without additional class label information. Also, the coloring network 520 of the present disclosure activates adaptive instance normalization so as to improve a colorization performance.

First, the memory network 210 identically receives a query image provided to the coloring network 220 as an input, and is trained to efficiently derive information required to color the query image. According to an embodiment of the present disclosure, the memory network 210 is configured to store three different types of information, such as a key memory, a value memory, and an age (operation S1). In detail, a key memory K stores information about spatial features of input data. The key memory is used to calculate a cosine similarity with an input query. A value memory V stores color features used as a condition of the coloring network 520 later. The key memory and the value memory are extracted from training data. Also, an age vector A indicates a life of an item stored in a memory without being used.

An entire memory structure M of the present disclosure may be represented as Equation 1 below. Here, K and V are values extracted from a same image, and regarding the same image, K contains a spatial feature extracted via an artificial neural network, and V contains a color feature obtained by extracting color information from the image.

$$M = (K_1, V_1, A_1), (K_2, V_2, A_2), \ldots, (K_m, V_m, A_m). \quad \text{[Equation 1]}$$

In Equation 1, m denotes a memory size.

First, the query generation unit 211 of the memory network 210 generates a query q (operation S2). As shown in FIG. 4, the query q is configured by first transmitting an input image X via ResNet18-pool5 layers (K. He, X. Zhang, S. Ren, and J. Sun. Deep residual learning for image recognition. In The IEEE Conference on Computer Vision and Pattern Recognition (CVPR), pages 770-778, 2016) pre-trained at ImageNet (J. Deng, W. Dong, R. Socher, L.-J. Li, K. Li, and L. FeiFei. Imagenet: A large-scale hierarchical image database. In Computer Vision and Pattern Recognition, 2009. CVPR 2009. IEEE Conference on, pages 248-255. IEEE, 2009). This may be represented as $X_{rp5} \in R^{512}$. Here, Xrp5 is a high-dimensional representation extracted via ResNEt, and is identical to the query q. Also, R512 indicates 512 dimensions.

Also, in the present disclosure, a feature vector is used on the basis that a layer is pooled to abstract spatial information. For example, a rose should be recognized as the same rose regardless of where the rose is spatially located in an image. In the present disclosure, a feature representation is transmitted via a linear layer, together with and $W \in R^{512 \times 512}$ and $b \in R^{512}$, which are learnable parameters. Here, W denotes a weight and b denotes a bias in a neural network. Lastly, the present disclosure normalizes a vector as in Equation 2, so as to generate the query q. In Equation 2 below, $\|q\|_2 = 1$.

$$q = WX_{rp5} + b, \quad q = \frac{q}{\|q\|} \quad \text{[Equation 2]}$$

Next, the neighbor calculation unit 212 calculates k-nearest neighbors, based on similarities between the query and keys (operation S3). According to an embodiment of the present disclosure, the k-nearest neighbors may be determined to be memory slots having similarities between the query and the spatial features from 1 to k, based on cosine similarities between the query and key memory values. When q is given, the memory network 510 calculates a nearest neighbor k as in Equation 3, with respect to cosine similarities between the query and keys, and returns $V[n_1]$ that is a 1-nearest neighbor. $V[n_1]$ denotes V among a (K,V) pair of a memory slot most similar to q.

This is used as the condition for the coloring network 520 later.

$$d_i = q \cdot K[i]. \quad \text{[Equation 3]}$$

$$NN(q, M) = \underset{i}{\mathrm{argmin}}\, q \cdot K[i].$$

$$(n_1, \ldots, n_k) = NN_k(q, M).$$

In Equation 3, NN(q,M) indicates a calculation of fetching, from M (memory), a memory slot having a spatial feature most similar to the query q, and (n1, nk) indicate k memory slots in the memory, which have spatial features similar to q, listed in an order of similarity ((n1: most similar, nk: k-th similar).

Next, the color feature determination unit 213 generates a color feature to indicate color information stored in the value memory (operation S4). To indicate the color information stored in the value memory, the present disclosure uses two types of variants, i.e., color distribution and a red, green, blue (RGB) color value. In other words, according to an embodiment of the present disclosure, because required information varies depending on input data, the two types of variants are set for the color feature V.

The former has a form of color distribution regarding 313 quantized color values represented as $C_{dist} \in R^{313}$. Cdist is obtained by abstracting all pieces of color information present in a large amount of image data to 313 colors, and then calculating a probability value regarding how many of 313 colors are present in each image. The probability value is calculated by converting an input RGB image into an international commission on illumination (CIE) Lab color space and quantizing an ab value to 313 color bins. In addition, the present disclosure may use parametrization that is existing technology to quantize the ab value. The color distribution is suitable to an image having various colors and complicated drawing.

The second variant is the RGB color value, and is a set of 10 dominant RGB color values of an image indicated by $C_{RGB} \in R^{10 \times 3}$. Here, the most dominant 10 colors (pixel values) are extracted from an input image by using a tool called Color Thief. A neural network is easily and quickly trained when a direct RGB value is used compared to when complex color distribution is used, and thus, when $C_{RGB}$ is used as a color feature, one shot coloring setting operates better. Accordingly, the value memory of the present disclosure may be represented as Equation 4 below.

$$V = C_{dist} \text{ or } C_{RGB} \qquad \text{[Equation 4]}$$

As described above, the extracted color information may be used as a condition for the coloring network 220 of the present disclosure. One of or both the two variants described above may be used, but to prevent confusion in a following equation, the present disclosure uses an expression $C_{dist}$ for the value memory.

Then, the triplet loss calculation unit 214 calculates a threshold triplet loss, based on a comparison between a threshold and a distance between the color features (operation S5). In an embodiment of the present disclosure, a triplet loss is selected to maximize a similarity between the query and a positive key and minimize a similarity between the query and a negative key. The positive key indicates a key memory value (K[np]) having a same index as a nearest value memory value (V[np]) from among value memory values of which distances from a color feature value of the query image are less than a certain threshold. On the other hand, the negative key indicates a key memory value (K[nb]) having a same index as a value memory value (V[nb]) having a smallest distance, from among value memory values of which distances from the color feature value of the query image exceed the certain threshold.

An existing triplet loss method mainly targets at bringing images of a specific class (positive neighbor) closer than images of another class (negative neighbor). According to an existing supervised triplet loss, when $V[n_p]$ has a same class label as the input query q, a smallest index p is introduced, and thus, np becomes a positive neighbor of q. A negative neighbor of q is defined by a smallest index b, and $V[n_b]$ has a class label different from q.

The existing supervised triplet loss requires class label information, but because most data for a coloring work does not provide label information, the use thereof is limited. For example, it is impossible to label all single frames of animation with class labels thereof (for example, whether the class label is displayed on a frame provided with a specific letter, object, or background).

To solve such an issue, the threshold triplet loss of the present disclosure may be applicable to a fully unsupervised setting. According to an embodiment of the present disclosure, when there are two images and a distance between color features of the two images is within a specific threshold, it is considered that the two images have similar spatial features and thus are highly likely to be in a same class. In the present disclosure, the specific threshold is represented as a hyperparameter δ.

As a distance measurement value $C_{dist}$ between two color features, the present disclosure calculates a Kullback-Leibler (KL) divergence of a color distribution for the quantized ab value. Regarding $C_{RGB}$, the present disclosure calculates a color distribution by converting an RGB value into a CIE Lab value by using CIEDE2000. In detail, according to an embodiment of the present disclosure, a method of measuring a distance between color features is differently set for each type of feature color. $C_{dist}$ is a probability value configured in 313 dimensions, and thus KL divergence that is a method of measuring a distance between probability values is used. On the other hand, $C_{RGB}$ is a color feature configured in an actual pixel value, and thus CIEDE2000 is used. CIEDE2000 is a method of measuring a distance between colors most similarly to perception of a person as much as possible, considering a characteristic that the eyes of the person are more sensitive to a certain color than Euclidean distance, and to use CIEDE2000, an RGB pixel value is converted into a CIE Lab pixel value to measure the distance.

According to an unsupervised threshold triplet loss setting of the present disclosure, the present disclosure newly defines a positive neighbor np as a memory slot having a minimum index, when a distance between $V[n_p]$ and a correct desired value v (for example, a color feature of the query image) is within a color threshold δ. The memory network 210 is trained such that, when the query image is provided, a color feature (value memory) corresponding to a spatial feature (key memory) of the query image is automatically extracted by only using the spatial feature. Accordingly, because the memory network 210 is trained to fetch the value memory most similar to the color feature of the query image, the color feature is referred to as the correct desired value v. Here, relationships between the color threshold δ, $V[n_p]$, may be represented as Equation 5 below.

$$KL(V[n_p] \| v) < \delta. \qquad \text{[Equation 5]}$$

Similarly, the present disclosure may define nb as a memory slot having a smallest index, in which the distance between $V[n_p]$ and the correct desired value v exceeds the color threshold δ, and at this time, the color threshold δ may be represented as Equation 6 below.

$$KL(V[n_b] \| v) > \delta. \qquad \text{[Equation 6]}$$

Lastly, the threshold triplet loss according to an embodiment of the present disclosure may be represented as Equation 7 below.

$$L_t(q, M, \delta) = \max(q \cdot K[n_b] - q \cdot K[n_p] + \alpha, 0) \qquad \text{[Equation 7]}$$

The threshold triplet loss of the present disclosure minimizes the distance between the positive key and the query while maximizing the distance between the negative key and the query.

Figure 5:
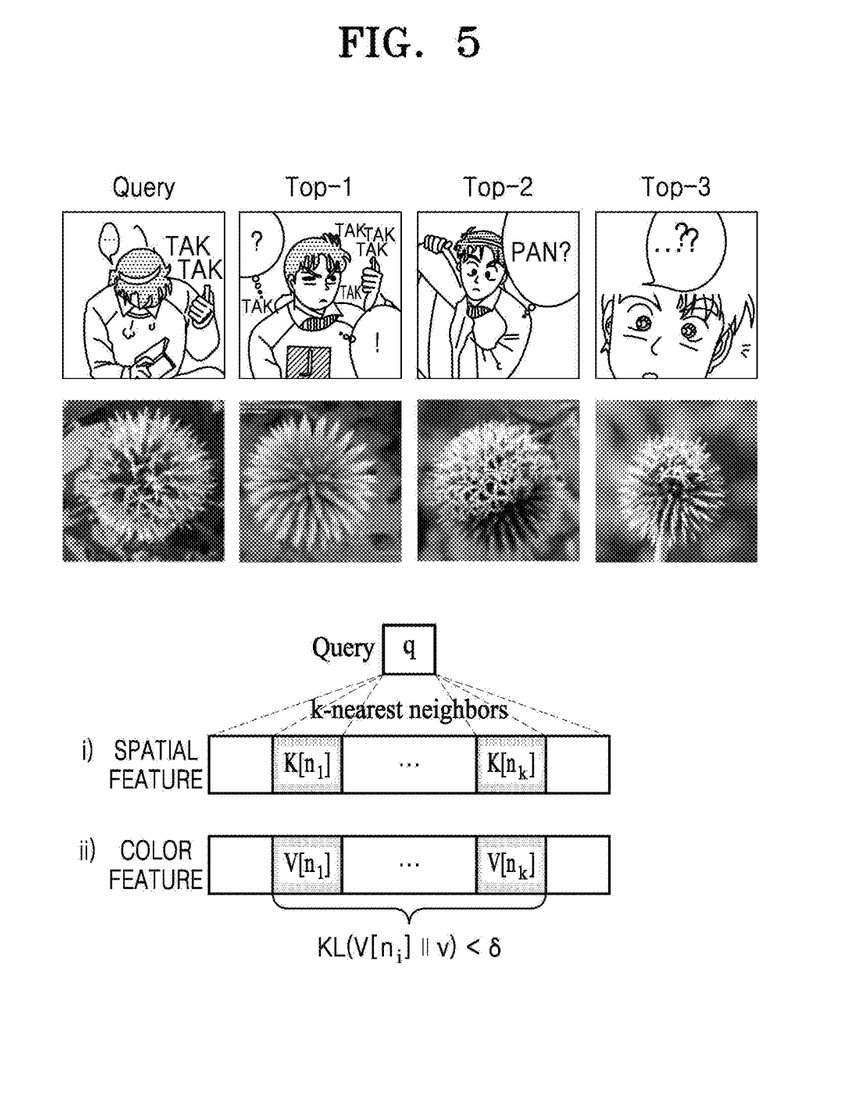
FIG. 5 illustrates coloring results based on a threshold triplet loss according to an embodiment of the present disclosure.

FIG. 5 illustrates coloring results based on a threshold triplet loss according to an embodiment of the present disclosure.

According to the present disclosure, images having i) similar spatial features (for example, k-nearest neighbors) and ii) similar color features (for example, color distances within a specific threshold) belong to a same class. According to the present disclosure, the threshold triplet loss is calculated based on i) and ii) above. FIG. 5 illustrates examples in which 3 types of top color features derived from a memory network of the present disclosure are applied to a target image. Referring to FIG. 5, it is verified that the memory network of the present disclosure is trained to derive a color feature having a high relation to content of a query image, by using the threshold triplet loss.

In detail, it is verified that images corresponding to top three (top-1, top-2, and top-3) of FIG. 5 are in a same class as the query image. In particular, in a first row, i.e., cartoon images, top three images share same characters, clothes, and backgrounds. Accordingly, the threshold triplet loss enables the memory network of the present disclosure to search for the color feature having the high relation to the content of the query image.

Next, the update unit 215 updates the memory, based on whether a distance between a top value and a value of a newly input query is within the threshold (operation S6). The memory M according to an embodiment of the present disclosure is updated after a new query q is introduced to a network. The memory may be updated as (i) and (ii) below, based on whether a distance between a top value (top-1 value) $V[n_1]$ and a correct value v (for example, a color feature of a new query image) is within a color threshold.

(i) When the distance between $V[n_1]$ and v is within the color threshold (corresponds to Case 1 of FIG. 4), the present disclosure updates a key by averaging and normalizing $K[n_1]$ and q. An age of n1 is also re-set to 0. When $KL(V[n_1]||v) > \delta$, an indication of update may be represented as Equation 8 below.

$$K[n_1] \leftarrow \frac{q + K[n_1]}{\|q + K[n_1]\|}, A[n_1] \leftarrow 0 \quad \text{[Equation 8]}$$

(ii) When the distance between $V[n_1]$ and v exceeds the color threshold (corresponds to Case 2 of FIG. 4), there is no memory slot matching v in the current memory. Accordingly, (q,v) may be newly recorded on the memory. In the present disclosure, a memory slot (for example, a slot that is most recently used) having an oldest age is randomly selected, and the selected memory slot is indicated by nr and replaced by (q,v). Also, in the present disclosure, an age of the replaced slot may be re-set to 0. In detail, when $KL(V[n_1]||v) > \delta$, the update may be represented as Equation 9 below.

$$K[n_r] \leftarrow q, V[n_r] \leftarrow v_q, A[n_r] \leftarrow 0 \quad \text{[Equation 9]}$$

Then, the coloring network 220 performs coloring, based on the color feature generated by the memory network 210. The coloring network 220 of the present disclosure is a conditional generative adversarial network including the generator 221 (G) and the determiner 222 (D). The generator 221 and the determiner 222 may employ a well-known configuration of an existing deep learning algorithm, except a distinct configuration of the present disclosure described below.

According to an embodiment of the present disclosure, the determiner 222 distinguishes between an actual image and a color output by using a gray scale image and a color feature as conditions, whereas the generator 221 deceives the determiner 222 by generating a realistic color image including a gray scale input X and a color feature C. A smooth L1 loss between a generated output G (x, C) and a ground-truth image y is added to an objective function of the generator 221 as in Equation 10 below.

$$L_{sL1}(y, \hat{y}) = \begin{cases} \frac{1}{2}(y - \hat{y})^2 & \text{for } |y - \hat{y}| \le \delta \\ \delta|y - \hat{y}| - \frac{1}{2}\delta^2 & \text{otherwise.} \end{cases} \quad \text{[Equation 10]}$$

According to the present disclosure described above, the generator 221 may generate an output that does not deviate too far from the ground-truth image. Complete objective functions of the present disclosure for D and G may be represented as Equations 11 and 12 below.

$$L_D = \mathbb{E}_{g \sim P_{data}}[\log D(x, C, y)] + \quad \text{[Equation 11]}$$
$$\mathbb{E}_{x \sim P_{data}}[(1 - \log D(x, C, G(x, C)))].$$

$$L_G = E_{x \sim P_{data}}[(1 - \log D(x, C, G(x, C)))] + L_{sL1}(y, G(x, C)). \quad \text{[Equation 12]}$$

During a training process, the generator 221 and the determiner 222 are trained by extracting a color feature from the ground-truth image, in the present disclosure.

Figure 6:
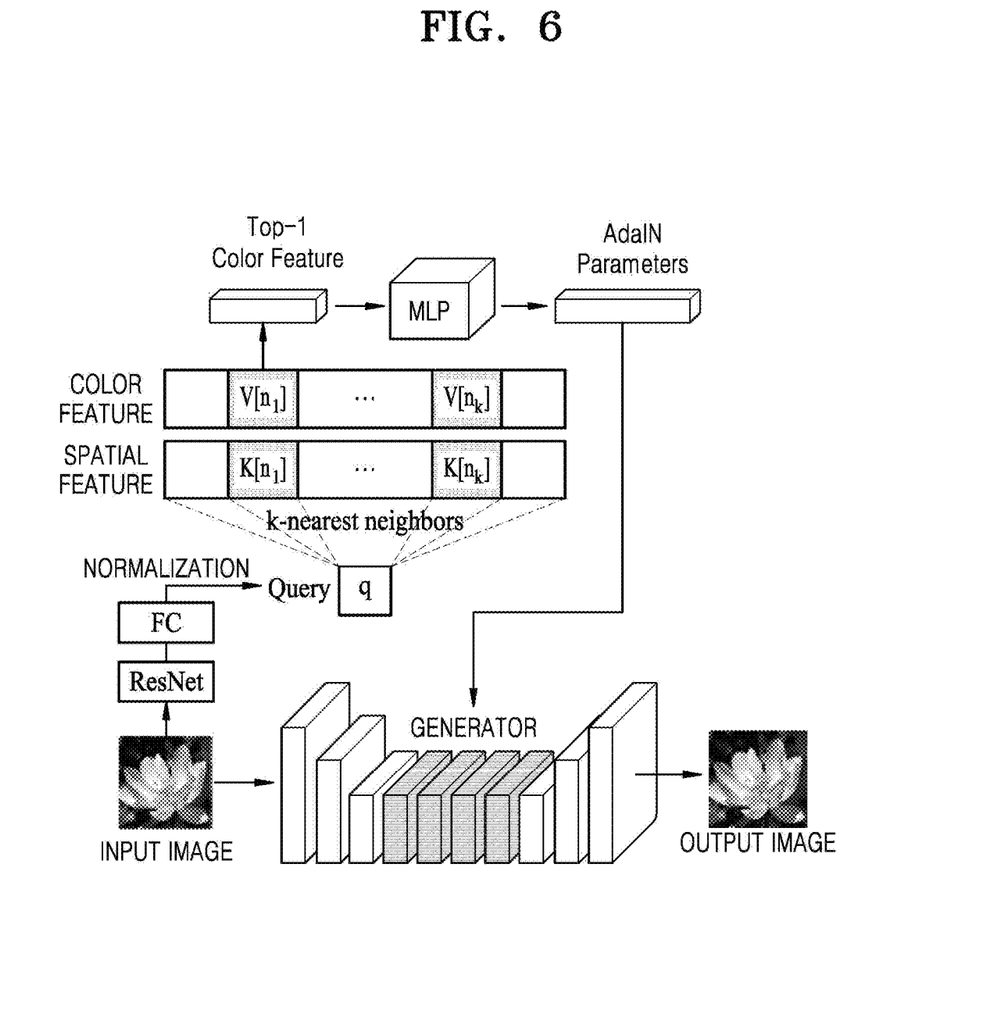
FIG. 6 is a diagram for describing providing a color value to a generator for a test period, according to an embodiment of the present disclosure.

FIG. 6 is a diagram for describing providing a color value to a generator for a test period, according to an embodiment of the present disclosure.

Referring to FIG. 6, during a test time, the present disclosure provides, as a condition, a color value searched for by a memory network to a generator trained as in FIG. 5. In detail, a k-nearest neighbor is determined based on a query q generated from an input image, an adaptive instance normalization (AdaIN) parameter is generated by extracting a top color feature and passing the same via a multi-layer perceptron (MLP), and a found color value is provided to the generator. Also, in the present disclosure, an architecture of a developer network is applied to an architecture of a determiner.

Referring to a coloring process according to an embodiment of the present disclosure in detail, the present disclosure performs coloring with adaptive instance normalization on the input image. Coloring (colorization) is not generally first perceived in relation to style transfer. The style transfer is a work of transmitting a color of a reference image to a target image, and is identical to a work of the present disclosure of transmitting a color feature to an actual target gray scale image. In this regard, effective AdaIN is applied to style information transmission so as to effectively transfer a style, in the present disclosure. In other words, affine transformation parameters used in an AdaIN module may be obtained, by directly supplying a color feature to parameter-regression networks of the present disclosure, as in Equation 13 below.

$$AdaIN(z, C) = \sigma(C)\left(\frac{z - \mu(z)}{\sigma(z)}\right) + \mu(C) \quad \text{[Equation 13]}$$

In Equation 13, z is activation of previous convolution layer, and is first standardized or scaled via a standard deviation, and is shifted by an average of color features C.

In addition, as shown in FIG. 4, the present disclosure may increase a coloring performance by inputting both the gray scale image and the color feature as conditional inputs of the determiner 222.

Figure 7:
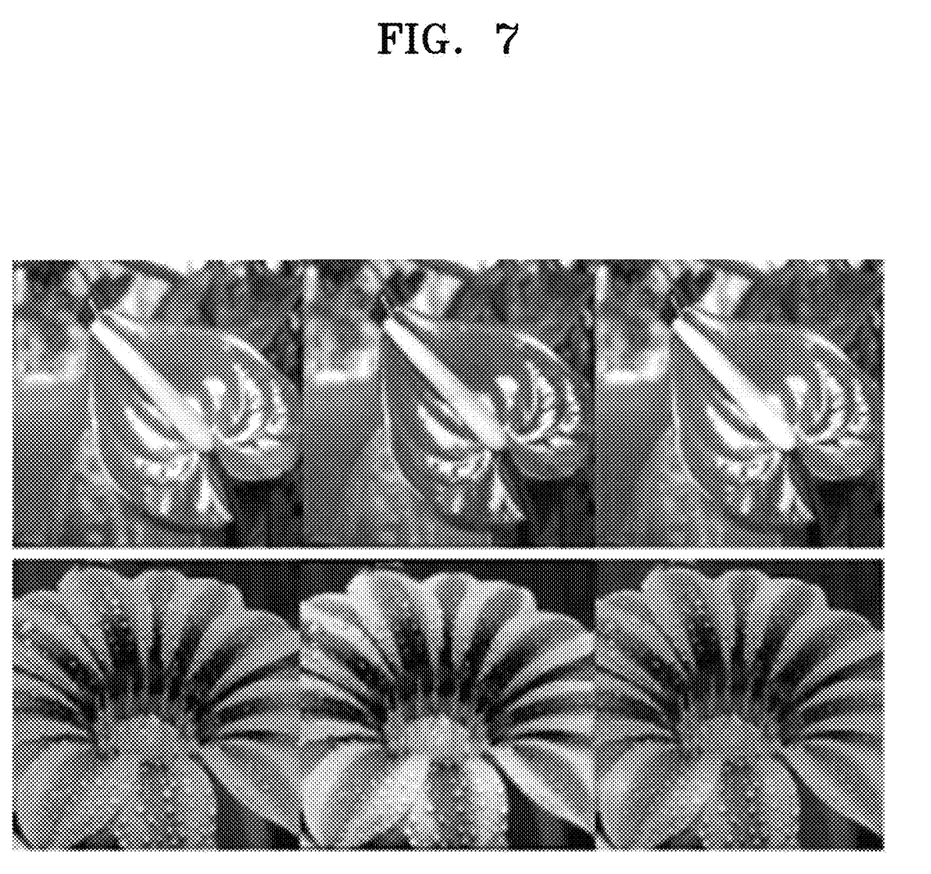
FIG. 7 is a diagram showing results of applying an existing method and a coloring method of the present disclosure.

FIG. 7 is a diagram showing results of applying an existing method and a coloring method of the present disclosure.

In FIG. 7, a first column shows ground-truth images, a second column shows results according to an existing coloring model, and a third column shows results according to a deep learning-based coloring method according to an embodiment of the present disclosure. Outputs of the second and third columns are obtained via same repetition of each approach. Compared to existing coloring models in which color conditions are integrated via a simple element-wise addition, more vivid and high-quality coloring results may be obtained as in the third column of FIG. 7, by using the AdaIN-based method of the present disclosure.

The present disclosure described above has the following effects. First, the present disclosure enables one shot or few shot coloring because coloring may be learned by using minimum pieces of data. This is possible because a memory network of the present disclosure extracts and stores useful color information from given training data. When an input is provided to a coloring model of the present disclosure, a query is transmitted to an external memory network to extract the color information related to coloring. Second, the coloring model of the present disclosure is able to capture an image of a class that is not frequent, and resolve a dominant color effect that is an issue of an existing coloring model. In detail, according to the present disclosure, because the memory network is trained to fetch a value memory corresponding to a key memory value most similar to a spatial feature, the dominant color effect may be resolved by coloring a color feature suitable to a color of a character, instead of generalizing and coloring the character with a dominant color even in a rare case. Third, the present disclosure provides a new threshold triplet loss that enables training of the memory network in an unsupervised environment. According to the coloring model of the present disclosure, labeled data is not required to successfully color an image.

An embodiment according to the present disclosure described above may be recorded on a computer-readable recording medium by being implemented in a form of program instructions executable via various computer elements. The computer-readable recording medium may include a program instruction, a data file, a data structure, and the like solely or in combination. A program instruction recorded on the computer-readable recording medium may be designed and configured specially for the present disclosure or may be publicly known and available to one of ordinary skill in the art of computer software. Examples of the computer-readable recording medium include hardware devices specially designed to store and execute program instructions, such as magnetic media, such as a hard disk, a floppy disk, and magnetic tape, optical recording media, such as a CD-ROM and a DVD, magneto-optical media such as a floptical disk, and read-only memory (ROM), random-access memory (RAM), and flash memory. Examples of the computer instructions include not only machine code generated by a compiler, but also high-level language code executable by a computer by using an interpreter or the like. The hardware device may be changed to one or more software modules to perform processes according to the present disclosure, and vice versa.

Certain executions described in the present disclosure are embodiments and do not limit the scope of the present disclosure in any way. For brevity of the specification, general electronic configurations, control systems, software, and other functional aspects of systems may be omitted. In addition, connection or connection members of lines between components shown in the drawings exemplarily represent functional connections and/or physical or circuit connections, and in an actual apparatus, may be replaced or may be implemented as various additional functional connections, physical connections, or circuit connections. Also, elements described herein may not be essential elements for application of the present disclosure unless the elements are particularly described as being "essential" or "critical".

The term "the" and similar referential terms in the specification (specifically in the claims) of the present disclosure may be used for both the singular and the plural. Further, when a range is described in the present disclosure, the present disclosure includes inventions to which individual values belonging to the range are applied (unless otherwise stated), and it is considered that each individual value configuring the range is described in the detailed description of the present disclosure. Lastly, unless an order is clearly stated or unless otherwise stated, operations of a method according to the present disclosure may be performed in an appropriate order. The present disclosure is not necessarily limited by an order the operations are described. In the present disclosure, the use of all examples or exemplary terms (for example, "etc.") is merely for describing the present disclosure in detail and the scope of the present disclosure is not limited by those examples or exemplary terms unless defined in the claims. Also, it would be obvious to one of ordinary skill in the art that various modifications, combinations, and changes may be configured according to design conditions and factors within the scope of claims or equivalents.

The invention claimed is:

1. A deep learning-based coloring system comprising:
a memory network configured to provide a color feature in response to a specific query and including a key memory related to a spatial feature and a value memory related to a color feature; and
a coloring network configured to perform coloring, based on the color feature generated by the memory network, wherein
the memory network comprises:
a query generation unit configured to generate a query;
a neighbor calculation unit configured to calculate k-nearest neighbors, based on similarities between the query and key memory values;
a color feature determination unit configured to generate a plurality of color features for indicating color information stored in the key memory;
a threshold triplet loss calculation unit configured to calculate a threshold triplet loss, based on a comparison between a threshold and a distance between the plurality of color features generated by the color feature determination unit; and
a memory update unit configured to update a memory, based on whether a distance between a top value and a value of a newly input query is within the threshold.

2. The deep learning-based coloring system of claim 1, wherein the k-nearest neighbors are determined to be memory slots having similarities between the query and the spatial feature from 1 to k, based on cosine similarities between the query and the key memory values.

3. The deep learning-based coloring system of claim 2, wherein the pre-assigned value is a value memory value having a same index as a key memory value having a highest cosine similarity with the query, when a 1-nearest neighbor is calculated from among the k-nearest neighbors.

4. The deep learning-based coloring system of claim 1, wherein the threshold triplet loss is a value that maximizes a similarity between the query and a positive key and minimizes a similarity between the query and a negative key.

5. The deep learning-based coloring system of claim 4, wherein
the positive key is a key memory value having a same index as a nearest value memory value from among value memory values of which distances to a color feature value of the query are less than the threshold, and
the negative key is a key memory value having a same index as a value memory value having a smallest distance from among value memory values of which distances to the color feature value of the query exceed the threshold.

6. The deep learning-based coloring system of claim 1, wherein the color feature comprises two types of variants, wherein the two types of variants include $C_{dist}$ obtained by calculating a probability value regarding how many of 313 colors pre-set for each image there are, and $C_{RGB}$ obtained by extracting 10 pixel values most dominant for each image by using a pre-set library.

7. The deep learning-based coloring system of claim 1, wherein the memory network determines that images having spatial features corresponding to the k-nearest neighbors and color features corresponding to color distances to the query, which are less than the threshold, belong to a same class.

8. The deep learning-based coloring system of claim 1, wherein the coloring network comprises a generator and a determiner,
wherein the determiner receives a gray scale input image and the color feature.

9. The deep learning-based coloring system of claim 1, wherein the memory network is configured to additionally store an age, wherein the age indicates a life of an item stored in the memory.

10. A deep learning-based coloring method performed by a computing device comprising a key memory related to a spatial feature and a value memory related to a color feature, the deep learning-based coloring method comprising:
generating a query;
calculating k-nearest neighbors, based on similarities between the query and key memory values;
generating a plurality of color features for indicating color information stored in the key memory;
calculating a threshold triplet loss, based on a comparison between a threshold and a distance between the plurality of color features; and
updating a memory, based on whether a distance between a pre-assigned value and a value of a newly input query is within the threshold.

11. The deep learning-based coloring method of claim 10, wherein the k-nearest neighbors are determined to be memory slots having similarities between the query and the spatial feature from 1 to k, based on cosine similarities between the query and the key memory values.

12. The deep learning-based coloring method of claim 11, wherein the pre-assigned value is a value memory value having a same index as a key memory value having a highest cosine similarity with the query, when a 1-nearest neighbor is calculated from among the k-nearest neighbors.

13. The deep learning-based coloring method of claim 10, wherein the threshold triplet loss is a value that maximizes a similarity between the query and a positive key and minimizes a similarity between the query and a negative key,
wherein the positive key is a key memory value having a same index as a nearest value memory value from among value memory values of which distances to a color feature value of the query are less than the threshold, and
the negative key is a key memory value having a same index as a value memory value having a smallest distance from among value memory values of which distances to the color feature value of the query exceed the threshold.

14. The deep learning-based coloring method of claim 10, wherein the color feature comprises two types of variants, wherein the two types of variants include $C_{dist}$ obtained by calculating a probability value regarding how many of 313 colors pre-set for each image there are, and $C_{RGB}$ obtained by extracting 10 pixel values most dominant for each image by using a pre-set library.

* * * * *